Feb. 13, 1951 H. A. HARTSOCK 2,541,417
AGRICULTURAL CROP SPRAYING MACHINE
Filed July 23, 1948 2 Sheets-Sheet 1
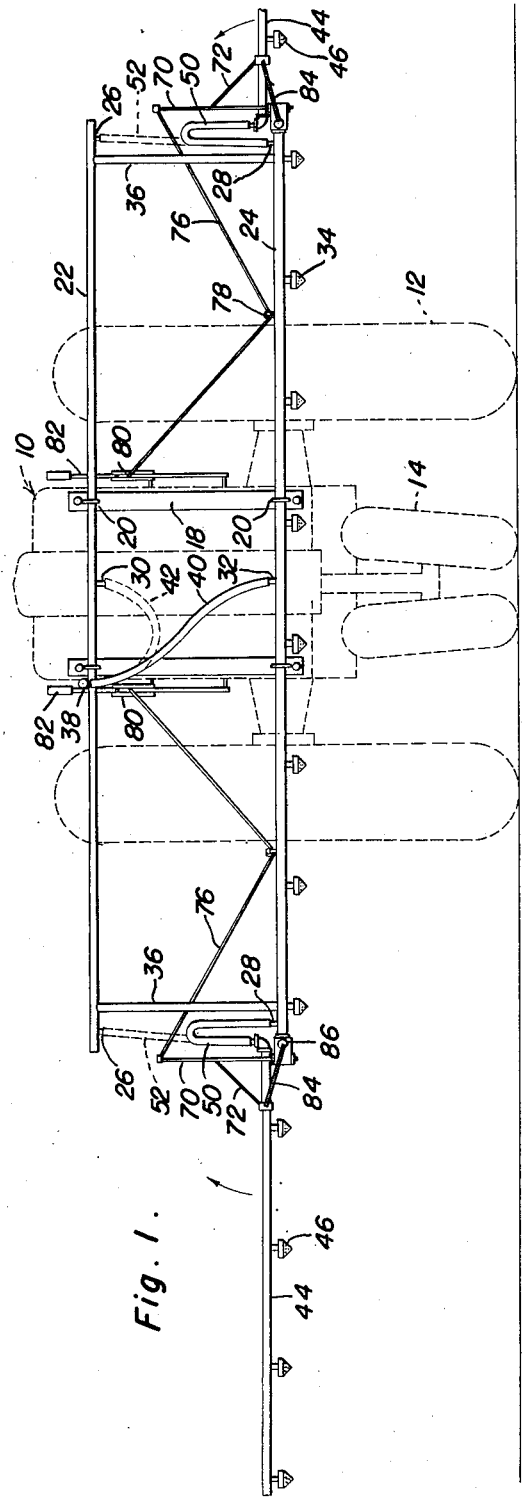
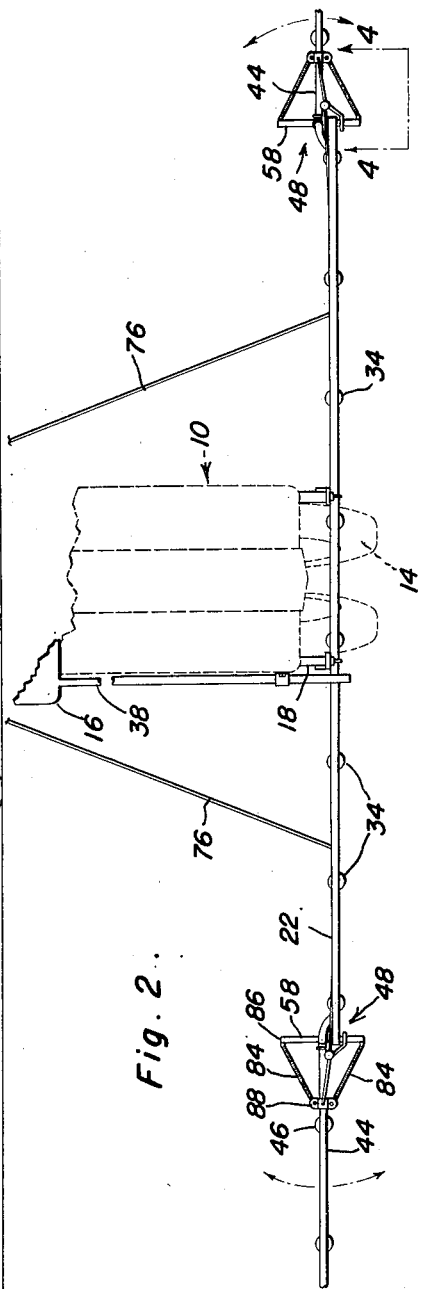
Harlan A. Hartsock
INVENTOR.

Feb. 13, 1951 H. A. HARTSOCK 2,541,417
AGRICULTURAL CROP SPRAYING MACHINE
Filed July 23, 1948 2 Sheets-Sheet 2
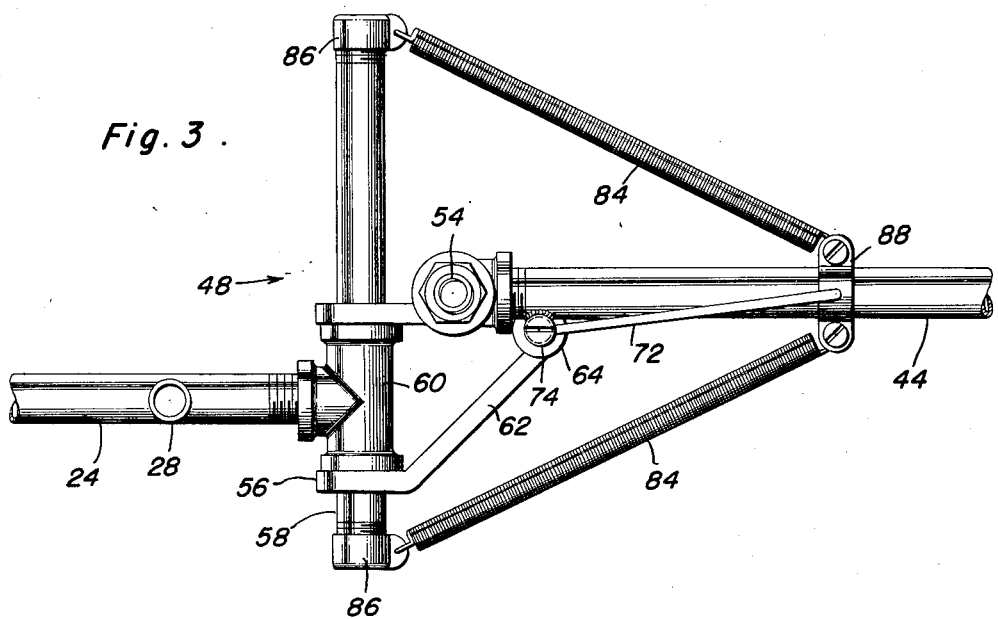
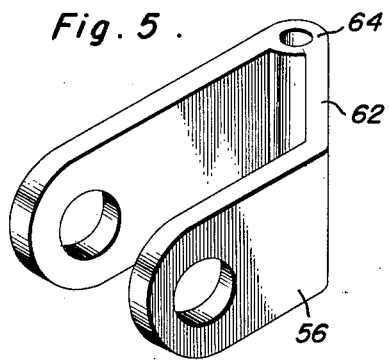
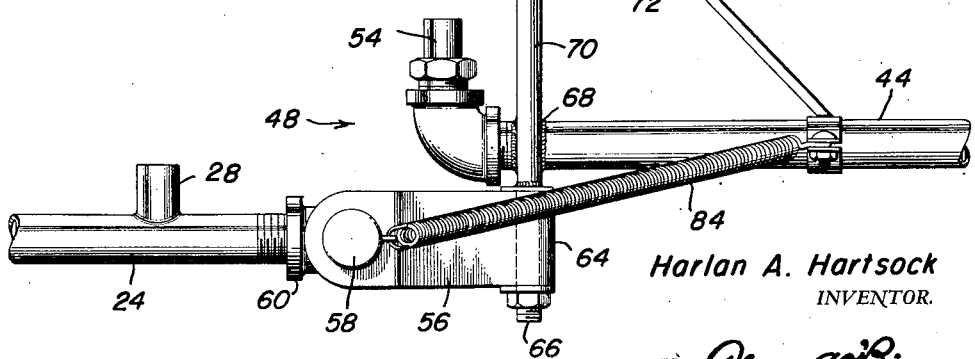
Harlan A. Hartsock
INVENTOR.

Patented Feb. 13, 1951

2,541,417

UNITED STATES PATENT OFFICE 2,541,417

AGRICULTURAL CROP SPRAYING MACHINE

Harlan A. Hartsock, Laurens, Iowa

Application July 23, 1948, Serial No. 40,396

7 Claims. (Cl. 299—39)

This invention relates generally to spraying machines and more particularly to a crop spraying machine of the type having automotive means such as a tractor and a tank containing fluid to be sprayed, the invention including novel means for distributing the fluid transversely of the machine as the same is moved over the land.

A primary object of this invention is to provide a crop spraying machine having spray pipe extensions on either side of the machine supported so as to allow pivotal movement thereof both in a vertical direction and in a horizontal direction, pivoting of the spray pipe extensions in a vertical direction being accomplished by the employment of a lever on the automotive means, whereby adjustment of the spray pipe extensions may be accomplished at the will of the operator of the machine, while pivotal movement of the spray pipe connections in a horizontal plane will ordinarily occur when the spray pipe connections contact an obstacle, thus preventing damage to the machine, and the spray pipe connections may be also shifted into position in which they are substantially parallel to the longitudinal axis of the machine in order to facilitate movement of the machine through gateways or whenever operation of the machine requires such deliberate pivoting of the spray pipe extensions.

Another very important object of this invention is to provide means whereby fluid may be alternatively sprayed from either the spray pipe extensions alone or from both the spray pipe extensions and a spray pipe located between the spray pipe extensions.

Another object of this invention, of a specific character and allied to the preceding object, is to provide a spraying machine in which a pipe and a spray pipe are arranged transversely of the machine and parallel to each other, the tank containing the fluid to be sprayed being alternatively connectible to either the pipe or the spray pipe, and since the spray pipe extensions are connected alternatively to either the said pipe or the said spray pipe, distribution of the fluid may be accomplished as mentioned in the preceding object.

Still another object of this invention is to provide a spraying machine in which laterally disposed and transversely extending spray pipe extensions are automatically biased into operative position.

And a last object to be mentioned specifically is to provide a crop spraying machine in which the structural details are such as to allow the manufacture of the machine economically, and to provide a spraying machine which is safe, extremely simple and convenient to mount on automotive means such as a tractor, and which will give generally efficient and durable service.

With these objects definitely in view, this invention resides in certain novel features of construction, combination and arrangement of elements and portions as will be hereinafter described in detail in the specification, particularly pointed out in the appended claims and illustrated in the accompanying drawings which form a material part of this application, and in which:

Figure 1 is a rear elevational view of the assembled machine mounted upon automotive means which latter is indicated in dash lines;

Figure 2 is a fragmentary top plan view of the structure illustrated in Figure 1;

Figure 3 is a fragmentary enlarged detail view of the hinge supporting means for the spray pipe extensions, this view being in plan;

Figure 4 is a vertical elevational view of the structure illustrated in Figure 3; and Figure 5 is an enlarged three dimensional view of a member incorporated in the hinge supporting means.

Similar characters of reference designate similar or identical elements and portions throughout the specification and throughout the different views in the drawings.

Referring now to the drawings in detail, the environment wherewith this invention is adapted to be used includes automotive means illustrated by the tractor 10 in Figures 1 and 2, the tractor having rear drive wheels 12, front wheels 14 and a normal complement of parts including a frame.

The automotive means will ordinarily be equipped with a tank 16, indicated fragmentarily in Figure 2, and attachment means illustrated somewhat diagrammatically at 18 and 20 will be used to mount a pipe 22 and a spray pipe 24 on the frame of the tractor 10. The pipe and spray pipe are disposed transversely of the tractor and the ends of these members are closed except for nipples 26 and 28. Another pair of similar nipples 30 and 32 are provided adjacent the center portions of the pipe 22 and the spray pipe 24 for a purpose hereinafter made abundantly clear.

The spray pipe 24 will be provided with a plurality of longitudinally spaced spray nozzles 34 of any suitable character and braces 36 will be used to rigidly connect the pipe 22 to the spray pipe 24 near the outer ends thereof. A conduit 38 of any suitable character extends from the tank 16 to a nipple adjacent to the nipples 30 and 32 already mentioned, and a flexible pipe or hose 40 will be used to connect the pipe 38 to the nipple 32 or alternatively to connect the conduit 38 to the nipple 30 as indicated at 42.

A pair of spray pipe extensions 44, having longitudinally spaced spray nozzles 46, is mounted to the ends of the spray pipe 24, or other suitable adjacent structure by means of a novel hinge supporting means, generally indicated by the numeral 48 and hereinafter described in more detail.

A flexible tube 50 is connectible to the nipple 28, at each end of the spray pipe 24, or alternatively connectible to the nipple 26 at each end of the pipe 22, this flexible tube 50 being substantially permanently connected to a nipple 54 on the end of each spray pipe extension 44. The hinge supporting means 48 has incorporated therewith a member 56 which is pivoted by means of a first hinge pin 58 on a barrel fitting 60 rigidly mounted on each end of the spray pipe 24. The member 56 comprises a pair of parallel arms integrally connected together by an angularly disposed plate 62, and this member also includes a socket or bearing 64 at the end of the member remote from the first hinge pin 58. A second hinge pin 66 is pivotally mounted in this bearing or socket 64 and disposed at right angles with the first hinge pin 58, and the second hinge pin 66 is welded, as indicated at 68, to the inner ends of the spray pipe extensions 44. It will be clear that this construction allows vertical as well as horizontal pivotal motion of the spray pipe extensions relative to the spray pipe 24.

The second hinge pin 66 is extended upwardly, as indicated at 70, to comprise a lever which may be braced by a brace 72, and which is provided with an eye member 74 to allow connection thereto of a cable 76. This cable 76 is entrained through suitable guide pulleys 78 and a guide member 80 on the spray pipe and the frame of the tractor, respectively, and the other end of each cable 76 is connected to a manually operated lever 82 on the tractor. In order that the spray pipe extensions 44 may be biased into position substantially transverse of the machine, a pair of helical springs or equivalent structure 84 are secured under tension between caps 86 on the end of the first hinge pin 58 and suitable bracket means 88 on the spray pipe extensions 44, as clearly indicated in Figures 3 and 4.

The operation of this invention will be clearly understood from a consideration of the foregoing description of the mechanical details thereof, taken in connection with the drawings and with the objects recited above. In recapitulation, it may be noted that the lever 82 will be used by the operator to adjust the spray pipe extensions 44 manually. It will be clear how the hinge supporting means 48 also allows for automatic re-alignment of the spray pipe extensions into operative positions should these spray pipe extensions encounter an obstacle and be temporarily swung in horizontal planes into positions more nearly parallel to the longitudinal axis of the machine, during operation of the machine. The springs 84 also tend to pull downwardly on the spray pipe extensions against the action of the cables 76, so that the said extensions are stabilized satisfactorily for normal operation.

Obviously, many minor variations may be made in the exact construction and proportionment of the various elements of this invention without departing from the spirit thereof, and the scope of this invention should be determined only as limited by a proper interpretation of the subjoined claims.

Having thus described the invention, what is claimed as new is:

1. In a crop spraying machine of the type having automotive means and a tank containing fluid to be sprayed, distributing means comprising a pipe and a spray pipe both horizontal and transversely disposed on said automotive means, primary connecting means for selectively connecting said pipe and spray pipe with a tank, a pair of spray pipe extensions hingedly supported at the ends of the spray pipe, and secondary connecting means for selectively connecting said spray pipe extensions with the pipe and spray pipe, whereby fluid may be alternatively sprayed from either the spray pipe extensions alone or from both the spray pipe and spray pipe extensions.

2. In a crop spraying machine of the type having automotive means and a tank containing fluid to be sprayed, distributing means comprising a pipe and a spray pipe both horizontal and transversely disposed on said automotive means, primary connecting means for selectively connecting said pipe and spray pipe with a tank, a pair of spray pipe extensions hingedly supported at the ends of the spray pipe, and secondary connecting means for selectively connecting said spray pipe extensions with the pipe and spray pipe, whereby fluid may be alternatively sprayed from either the spray pipe extensions alone or from both the spray pipe and spray pipe extensions, said primary connecting means comprising a flexible tube leading from said tank and selectively connectible to nipples on said pipe and spray pipe, and said secondary connecting means comprising flexible tubes connected to said spray pipe extensions and selectively connectible to nipples on said pipe and spray pipe.

3. Means according to claim 1 and wherein said spray pipe extensions are hinged to the ends of said spray pipe.

4. Means according to claim 1 and wherein said spray pipe extensions have hinge supporting means allowing pivotal movement of the spray pipe extensions both vertically and horizontally.

5. Means according to claim 4 and wherein said hinge supporting means includes means to bias said spray pipe extensions to extend laterally and transversely of the automotive means.

6. Means according to claim 1 and including manually operated means for pivotally shifting said spray pipe extensions in a vertical direction and for retaining said spray pipe extensions in vertically pivotally adjusted positions.

7. Means according to claim 1 and wherein each end of said spray pipe includes a member supported by a hinge pin to allow pivoting of the member about a horizontal axis, a second hinge pin carried by said member and carrying one of said spray pipe extensions, said second hinge pin being extended upwardly to comprise a lever, a lever on said automotive means, and a cable operatively connecting said levers, whereby the spray pipe extensions may be raised and lowered by an operator of the machine while allowing pivotal movement of the spray pipe extensions in a horizontal direction, and means to bias said spray pipe extensions to extend laterally and transversely of the automotive means.

HARLAN A. HARTSOCK.

(References on following page)

REFERENCES CITED

The following references are of record in the file of this patent:

UNITED STATES PATENTS

| Number | Name | Date |
|---|---|---|
| 1,026,608 | Schorn | May 14, 1912 |
| 2,169,948 | Gallupe | Aug. 15, 1939 |
| 2,210,346 | Stayton | Aug. 6, 1940 |
| 2,273,344 | Black et al. | Feb. 17, 1942 |
| 2,301,213 | Kang | Nov. 10, 1942 |
| 2,424,468 | Keathley | July 22, 1947 |

FOREIGN PATENTS

| Number | Country | Date |
|---|---|---|
| 289,935 | Italy | Nov. 2, 1931 |
| 443,618 | Great Britain | Mar. 3, 1936 |